Feb. 21, 1950          G. M. DALY          2,497,931
IMAGE PROJECTION AND CABINET BODY MEANS
Filed May 23, 1945          2 Sheets-Sheet 1
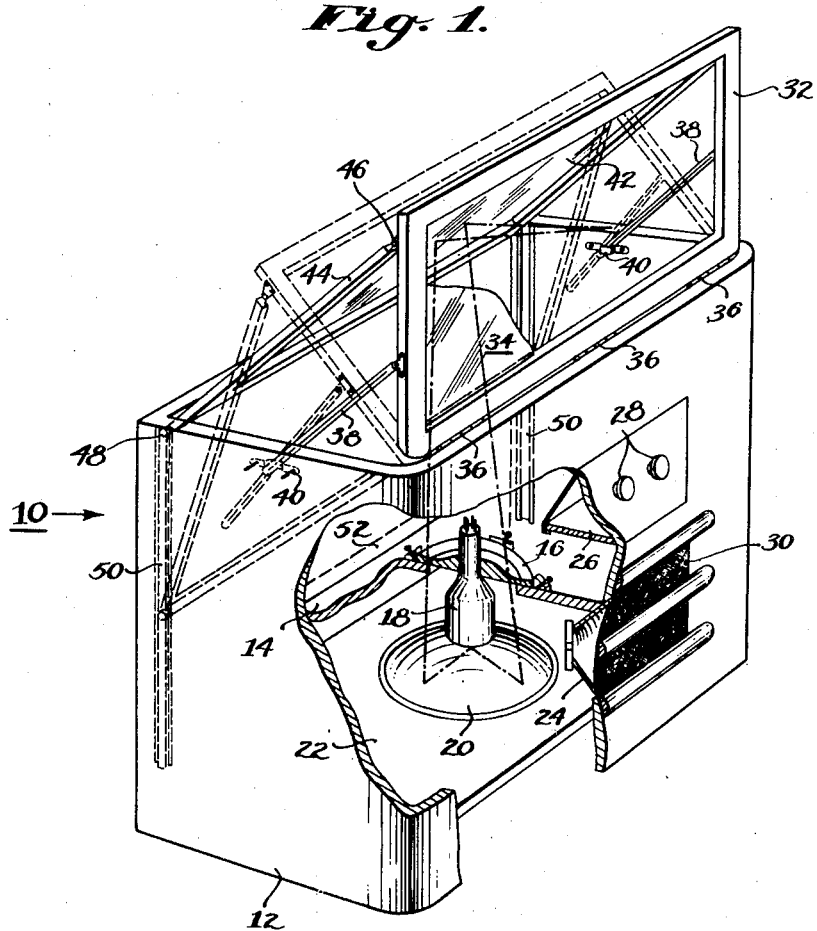
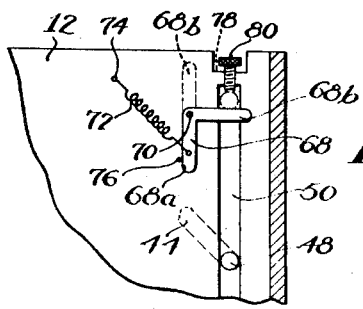
INVENTOR
GEORGE M. DALY.
BY
H. S. Grover,
ATTORNEY Feb. 21, 1950　　　　　G. M. DALY　　　　2,497,931
IMAGE PROJECTION AND CABINET BODY MEANS
Filed May 23, 1945　　　　　　　　　　　　2 Sheets-Sheet 2
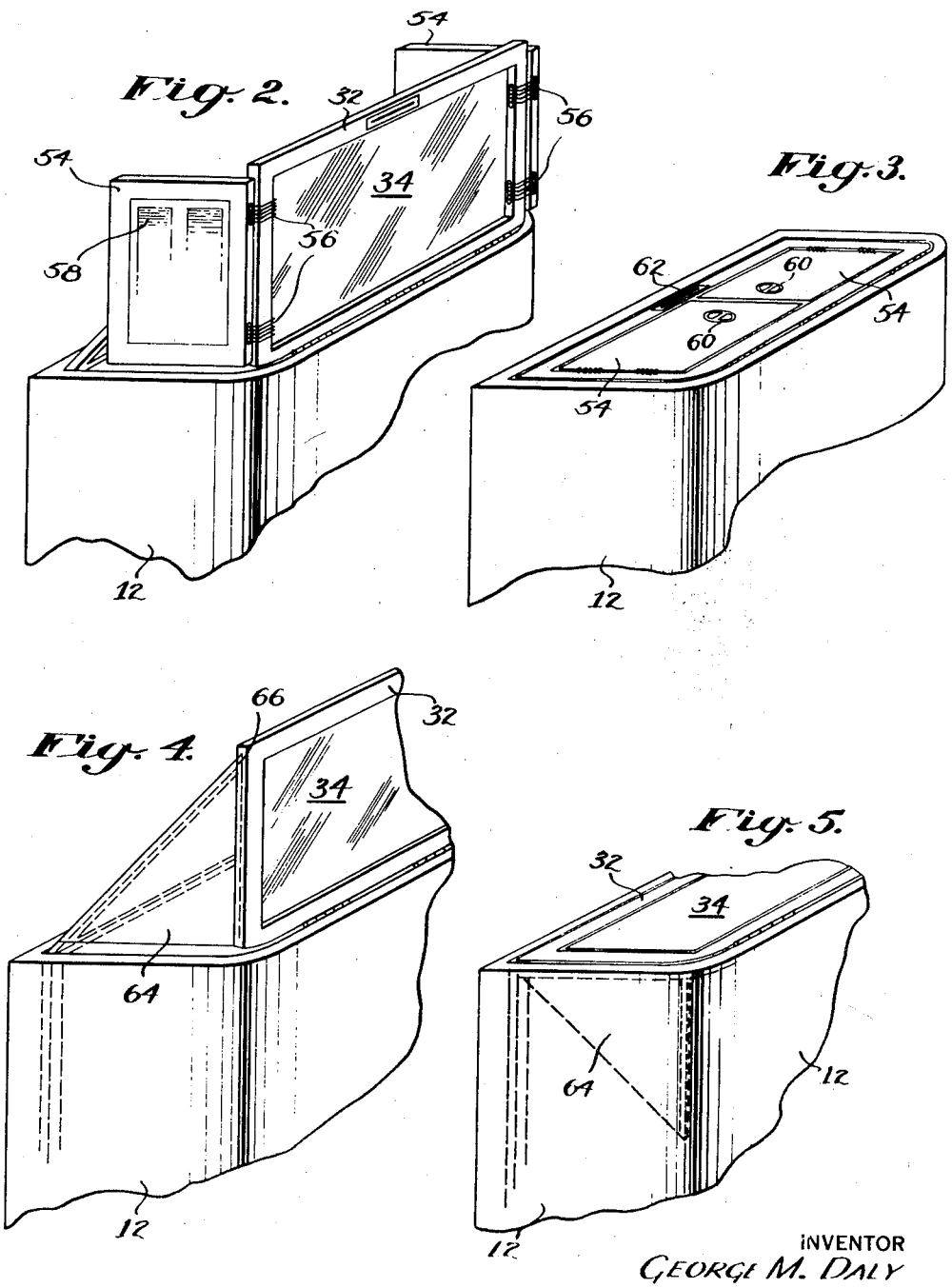
INVENTOR
GEORGE M. DALY
BY
H. S. Grover
ATTORNEY Patented Feb. 21, 1950

2,497,931

UNITED STATES PATENT OFFICE 2,497,931

IMAGE PROJECTION AND CABINET BODY MEANS

George M. Daly, Collingswood, N. J., assignor to Radio Corporation of America, a corporation of Delaware Application May 23, 1945, Serial No. 595,304

9 Claims. (Cl. 88—24)

The present invention relates generally to television devices, and more particularly to a cabinet or housing for the image-producing elements of such systems.

Certain types of image enlarging and projection systems have already been proposed in the art for television uses. One such type is that shown and claimed in U. S. Patent No. 2,273,801, granted to D. O. Landis on February 17, 1942. In the Landis system of image enlargement an electro-optical image of finite dimensions is developed upon the luminescent target of a cathode-ray image producing tube where the image area is bi-dimensional and substantially centered on the optical axis of the system. This light image is then reflected toward a viewing plane from a mirror which is formed as a light reflecting surface of revolution having its concave surface positioned to receive the initially developed electro-optical image. An aspherical zone plate is positioned in the optical path externally to the light path from the light source to the reflector but axially aligned with each and arranged to receive the reflected light rays from the reflecting surface as directed to the viewing plane and to correct for spherical aberrations introduced into the reflected light rays by the reflecting surface. This correcting plate cause a sharply focused enlargement of the original finite dimensional image to be developed at a plane which is located at a finite distance from each of the aspherical zone plates, the image producing tube and the reflecting surface. This condition comes about by the establishment of a common focal plane for all edge and axial rays at the viewing surface. Such an optical system is essentially of the fixed focus type, the focal length or object focus being determined by the radius of curvature of the spherical mirror. The image focus or "throw" is determined by the position of the cathode ray tube face with respect to the spherical mirror, and the aspherical zone plate is placed in the light path to correct for spherical aberration at the throw selected. As above indicated, the ultimate focal plane or distance of "throw" is at a finite distance which is usually quite long with respect to the focal length of the system.

The "throw" or distance from the spherical mirror to the viewing screen acts to limit the minimum dimensions of a cabinet enclosing an optical system of this nature. Consequently, such cabinets may have a viewing screen conventionally built-in as a fixed part of the housing itself, as in the aforementioned Landis Patent No. 2,273,801, in which case the overall dimensions of the cabinet often become so large as to detract from its appearance and to make it difficult to move conveniently from one location to another, or the cabinet may be provided with a viewing screen which can be actuated between viewing and non-viewing positions, being when in non-viewing position wholly or partly concealed within the cabinet. Structures of the latter type are disclosed in the co-pending applications of Horace R. Jones, Serial No. 579,256, filed February 22, 1945, now U. S. Patent No. 2,476,494, dated July 19, 1949, and H. M. Rundle, Serial No. 584,095, filed March 22, 1945, now U. S. Patent No. 2,438,022, dated March 16, 1948.

In accordance with the present invention there is provided for television receivers of the projection type a cabinet having a base which is preferably rectangular in cross-section. An image-producing device is enclosed within and supported by this base. To the upper edge of one of the walls of the base a frame holding a translucent screen is hinged. This screen, together with its frame, acts, in effect, as a closure member or lid for the cabinet, the frame and screen being upright or vertical when the latter is in viewing position, and horizontal or flush with the top edges of the cabinet walls when the screen is in non-viewing position. A panel having a reflecting surface is hinged along one edge to the rear surface of the frame, while on the other edge of the panel is mounted a pair of projections which respectively ride in a pair of vertical grooves formed in the side walls of the base.

When the screen is in non-viewing or horizontal position, the panel supporting the reflecting surface is completely enclosed within the cabinet and face-to-face with the rear wall thereof. When the screen is raised to viewing position, the panel is withdrawn from the cabinet to form an angle of approximately 45° with the screen, so that the image produced by the image-producing device will be focused from the reflecting surface of the panel onto the screen. Not only is the cabinet assembly of the present invention of pleasing appearance when the screen is in raised or viewing position, but since the screen and its frame together act in effect as a closure member or lid for the cabinet, the overall dimensions of the cabinet, when the screen is in lowered or non-viewing position, are at a minimum.

One object of the present invention, therefore, is to provide a cabinet for television receivers of the projection type.

Another object of the invention is to provide a television receiver cabinet in which a screen adapted to be viewed by an observer is enclosed within a frame or support which together with the screen acts as a closure member or lid for the cabinet.

A still further object of the invention is to provide a television receiver cabinet which is pleasing in appearance and which has minimum overall dimensions consistent with the optical requirements of the enclosed television image enlarging and projecting apparatus.

An additional object of the invention is to provide a television cabinet in which a screen adapted to be viewed by an observer is enclosed within a frame, and in which one or more protective panel sections are hinged to the frame and designed normally to overlie the screen when the latter is in non-viewing position, thereby concealing the screen as well as protecting it from dust and injury.

Other objects and advantages will be apparent from the following description of a preferred form of the invention and from the drawing, in which:

Fig. 1 is a modified perspective view of a television cabinet constructed in accordance with the present invention;

Fig. 2 is a view of a portion of Fig. 1 showing the addition thereto of a pair of screen-protecting panel sections;

Fig. 3 is a view of Fig. 2 showing the position of the panel sections when the screen is lowered;

Fig. 4 is a view of a portion of Fig. 1 showing the manner in which light shields may be added to the structure thereof;

Fig. 5 is a view of Fig. 4 with the screen in lowered position; and

Fig. 6 is a modification of a portion of Fig. 1.

Referring first to Fig. 1, there is shown a television receiver including a cabinet of the console type, generally indicated by the reference character 10. Within the base 12 of cabinet 10, which is of substantially rectangular cross-section, is a partition or shelf 14 supporting an aspherical zone plate or correcting lens 16 which, in turn, may serve to locate an image producing device such as a cathode-ray tube 18. The mounting assembly of the correcting plate 16 and tube 18 is described in Landis Patent No. 2,273,801, aforementioned, and hence will not be set forth in detail herein.

Cathode-ray tube 18 is positioned facing a spherical mirror 20 supported within a circular opening in a second shelf or partition 22. Also enclosed within base 12 in the embodiment of the invention illustrated herein is a loudspeaker 24, as well as a ledge or platform 26 for holding any desired number of the television receiver circuit components (not shown). These receiver circuit components are intended to be selectively controlled from the exterior of base 12 by control knobs 28, while the usual grille 30 in the front wall of base 12 is provided for loudspeaker 24.

A rectangular screen support frame 32 holding a translucent viewing screen 34 composed of any suitable material such as plastic, glass or the like, is pivotally secured to the top edge of the front wall of base 12 by means of a plurality of hinges 36. The screen support frame 32, together with the viewing screen 34, is designed to act, in effect, as a closure element or lid for cabinet 10, and is movable from a vertical viewing position (as shown in solid lines in Fig. 1) to a horizontal non-viewing or lowered position in which the screen support frame 32 is substantially flush with the upper edges of the walls of base 12. A position of screen support frame 32 intermediate the viewing and non-viewing positions of the viewing screen 34 is illustrated in broken outlines in Fig. 1.

In order to hold the viewing screen 34 securely in viewing position, two latch assemblies are provided. Each of these latch assemblies may be of any suitable type, and in the embodiment shown each may consist of a bar or rod 38 hinged to one side of the screen support frame 32 and slidably engaging a catch element 40 which is secured to the inner surface of the respective side wall of base 12 by screws or other suitable holding means. Each catch element 40 is designed for releasable locking engagement with its associated bar 38 when the screen support frame 32 is upright, and together act to maintain the viewing screen 34 in correct viewing position regardless of accidental jarring or handling of the cabinet, exterior vibration, or other factors which might tend to disturb the normal viewing position of the screen and thus cause defocusing of the image produced by cathode-ray tube 18 in a manner to be hereinafter described.

In order to direct the light rays passing through the correcting plate 16 to the viewing screen 34 when the latter is in its vertical viewing position, as shown in solid lines in Fig. 1, a reflecting surface such as a mirror 42 is provided. The mirror 42 lies flat upon, and is supported by, a rectangular support panel 44 (the edge of which shows in Fig. 1) two adjacent corners of which are pivotally secured to the rear surface of the screen support frame 32 near the upper edge thereof by a pair of hinges 46 only one of which is visible in the drawing due to the manner of taking the perspective view. A pair of cam followers or rollers 48 (only one of which is visible in the drawing) are mounted near the two other corners of panel 44. These rollers 48 are respectively slidably movable and supported within two vertical tracks or slots 50, respectively formed in the inner surface of the two side walls of base 12. When the screen 34 is in its viewing position, as shown in Fig. 1, the rollers 48 are positioned near the upper end of tracks 50, as illustrated, and panel 44 is caused to make an angle of substantially 45° with each of the viewing screen 34 and the optical axis of the system. At the same time, the location of the image viewing screen 34 relative to the remaining elements of the optical system is such that the plane of the viewing screen is exactly at the focal plane of the optical system, and thus sharply defined images are always produced on the viewing screen.

Upon a lowering of screen support frame 32 to the non-viewing position of screen 34 following an unlocking of the latch assembly 38, 40, panel 44 is lowered within the base 12 through the pivoting action of hinges 46 and the sliding action of rollers 48 in the tracks 50. A position of panel 44 with the rollers 48 intermediate the ends of tracks 50 is indicated in the drawing by the broken lines.

When the screen support frame 32 reaches its lowermost position and is substantially flush with the upper edges of the walls of base 12, panel 44 lies face-to-face with the rear wall of the base and is completely enclosed within the cabinet. Partition 14 is cut back from the rear wall of the base, as indicated at 52, so that the panel 44 may be lowered into the cabinet, as explained above.

It will be clear that other types of devices may be employed to permit slidable engagement between panel 44 and the walls of base 12. For example, instead of slots formed in the inner surface of the walls, a pair of vertical rails may be affixed to the walls to receive the followers 48. Furthermore, these followers 48 may be of any suitable design which will provide a slidable engagement either with the base 12 or with any cam follower receiving members mounted thereon.

In order to protect the optical system, including the correcting plate 16, the cathode-ray tube 18, and the spherical mirror 20, from the deleterious effects of dust or other foreign matter, an enclosure for these elements may be provided, such, for example, as that described in a copending application of I. G. Maloff, filed November 30, 1943, Serial Number 512,307 now abandoned.

When the translucent screen 34 is in horizontal or non-viewing position, it forms with frame 32 the top surface of cabinet 10. As such, it is prone to injury from various causes, as by the placing of heavy objects thereupon. To obviate such a condition, a pair of screen-protecting panel sections 54 are provided as shown in Figs. 2 and 3. These panel sections 54 are respectively mounted on the sides of the frame 32 by two pairs of wide-angle hinges 56.

When the screen 34 is in viewing position as shown in Fig. 2, panel sections 54 are normally swung back from the screen to shield the mirror 42 from the view of an observer not directly in front of the cabinet, such, for example, as an observer in the position from which the perspective view of Fig. 2 is taken. Hinges 56 are designed so that panel sections 54 may swing through a sufficiently wide angle to carry them from a position in which they are substantially coplanar respectively with the side walls of base member 12 (Fig. 2) to a position in which they are both substantially coplanar with the frame 32 (Fig. 3).

When it is desired to lower the screen 34 to non-viewing position, the panel sections 54 are swung around from their position as shown in Fig. 2 to overlie screen 34 as shown in Fig. 3. The panel sections 54 are so dimensioned as to be received together within frame 32 and be substantially coplanar therewith. Frame 32 is then lowered to a position substantially flush with the upper edges of the walls of base member 12, as shown in Fig. 3. By means of the construction of Figs. 2 and 3, screen 34 is protected from exterior injury at all times when it is covered by the panel sections 54.

The inner surface of one or both panel sections 54 may be adapted, as shown in Fig. 2, to hold a program chart or other descriptive matter for the convenience of the observers. A recessed handle 60 is provided in the outer surface of each of panel sections 54, and a similar recessed handle 62 is provided in frame 32 to facilitate the raising and lowering thereof.

In Figs. 4 and 5 is shown one manner in which another type of light shields which also have dust-protecting properties may be added to the cabinet 10 of Fig. 1 in the event that protective panel sections, such as shown in Figs. 2 and 3, are not employed. In Figs. 4 and 5, a pair of triangular-shaped light and dust shields 64 (only one being illustrated) are respectively secured to the sides of frame 32 in any suitable manner, such as by inserting one of the shield edges into a groove 66 cut into the inner surface of the frame as shown in Fig. 4. The light and dust shields 64 are preferably composed of relatively thin opaque material. When screen 34 is upright, shields 64 are in the position shown in Fig. 4, completely concealing the mirror 42 from the view of an observer to one side of cabinet 10. Upon the lowering of screen 34, shields 64 are pivoted as a unit with frame 32 about hinges 36 to be enclosed within cabinet 10 in the manner shown in Fig. 5. If desired, both the protective panel sections 54 of Figs. 2 and 3 and the light and dust shields 64 of Figs. 4 and 5 may be employed together. However, when the protective panel sections 54 are utilized, other light shields are usually unnecessary, and the members 64, if employed, will be useful principally for their dust-protecting properties.

A modification of Fig. 1 is shown by Fig. 6. This comprises the addition of an added means to permit a more precise alignment of the mirror 42 with respect to the viewing screen 34. These means include a bar 68 having two arms 68a and 68b extending at an angle of approximately 90° one to the other. The bar 68 is pivotally secured by a pin 70 to the inner surface of one of the side walls 12 of cabinet 10 near the upper end of the groove 50 formed in such wall, so that either arm 68a or 68b when in horizontal position may lie flat across the opening formed by the groove 50, as illustrated in Fig. 6. A spring member 72 has one end secured to the wall 12 by a screw or other suitable means 74, the screw 74 lying near or along a line bisecting the angle formed by arms 68a and 68b when such arms are in the position shown in solid lines in Fig. 6. The other end of spring member 72 is attached to arm 68a. When the bar 68 is in the position shown in solid lines in Fig. 6, its clockwise movement, which would normally result from the action of spring 72, is limited by a stop 76 which is so positioned as to maintain arm 68b substantially horizontal.

When roller or follower 48 rides up in slot 50 as a result of the raising of screen 34 to viewing position, the roller or follower 48 contacts arm 68b and forces it counterclockwise around pin 70 against the action of spring 72. Continued upward movement of roller 48 to the position shown in dotted lines causes arm 68b to assume a vertical position, also shown in dotted lines. Arm 68a, however, is now in substantially horizontal position below roller 48, and presses upwardly against the roller due to the action of spring 72. This tends to force the roller 48 against the top of groove 50, and if the groove is correctly dimensioned, mirror 42 will form an angle of precisely 45° with the viewing screen 34.

To allow for variations in construction, and also to compensate for dimensional changes in use as a result of moisture, dryness, etc., a recess 78 may be provided in the top edge of wall 12 above the slot 50. An adjusting screw 80 is receivable in this recess, and extends into the slot 50. By adjusting the screw 80, the maximum upward movement of roller 48 relative to the top of slot 50 may be selectively limited, and hence the angle that mirror 42 makes with the screen 34 altered in a vernier sense.

While the assembly of Fig. 6 has been described in connection with one wall of cabinet 10, it may be desirable to use one such mechanism on each side of the cabinet. An additional latch assembly such as shown in Fig. 6 may then be employed. Also, to facilitate raising and lowering of the screen support frame 32 and viewing screen 34, especially but not exclusively when the means of Fig. 6 is employed, the hinges 36 and/or 46 in Fig. 1 may be any suitable type of compression hinges known in the art.

When the structure of Fig. 6 is employed, the latch assembly 38, 40 of Fig. 1 becomes unnecessary and may be omitted if desired.

Having now described the invention in one of its preferred forms, it will be appreciated that the arrangement is equally applicable for use in connection with cabinets of the type wherein the images are developed from different forms of image-producing units, as well as where the images are developed from motion-picture film projection apparatus located within the cabinet and arranged to project optical images along a path toward the mirror 42 so that the final image may be observed on the screen 34. Also, it is to be understood that the invention may be applied to systems wherein the image is produced upon a cathode-ray tube, and then projected directly through a suitable enlarging lens system toward the mirror 42. In the latter case the spherical reflector 20 and the correcting lens 16 may be dispensed with, and a suitable enlarging lens system of the general type shown by Goldsmith U. S. Patent No. 2,307,211, issued on January 5, 1943, might be used, for example, to replace them.

Other modifications, of course, will become obvious to those skilled in the art to which the invention is directed. For example, the cabinet 10 may be so arranged that the closure member, comprising the screen support frame 32 and viewing screen 34, is hinged to one of the side edges of the front wall of base 12 instead of to the top edge of the front wall as illustrated in Fig. 1. According to such a modified arrangement, the screen support frame 32 and the viewing screen 34 act as a side closure member for cabinet 10 instead of as a lid, and the zone plate 16, cathode-ray tube 18, and spherical mirror 20 are so positioned within base 12 that the axis of the optical system is substantially horizontal rather than vertical as is the case in the embodiment of the invention shown in Fig. 1.

Having now described the invention, what is claimed and desired to be secured by Letters Patent is the following:

1. Projection apparatus comprising a cabinet body member having an image producing and projecting device supported therewithin, an image observation screen movable from viewing to non-viewing positions, a support frame for said image observation screen, said support frame being hinged at one edge thereof to said cabinet body member to form with said image observation screen a closure element for said cabinet, a reflecting element, a panel supporting said reflecting element and hinged to said frame, guide means on said body member whereby said panel slidably engages said body member and being substantially completely concealed within said body member when said image observation screen is in non-viewing position, and means responsive to the movement of said image observation screen from non-viewing to viewing position to cause said panel to be withdrawn from said body member to form such an angle with said support frame that the image produced by said image producing device will be reflected from said reflecting element onto said image observation screen.

2. Projection apparatus in accordance with claim 1, in which said body member is formed with a pair of substantially vertically oppositely-disposed slots serving as said guide means in the inner surface thereof, and a pair of rollers mounted on said panel and respectively slidably receivable in said slots.

3. Projection apparatus in accordance with claim 1, further comprising a pair of light and dust shields respectively secured to opposite edges of said support frame and extending in planes substantially perpendicular thereto, said light and dust shields being enclosed within said body member when said image observation screen is in non-viewing position, and being substantially intermediate the respective planes of said support frame and said panel when said image observation screen is in viewing position.

4. Projection apparatus in accordance with claim 1, in which said panel forms an angle of approximately 45° with said support frame when said image observation screen is in viewing position and approximately 90° with said support frame when said image observation screen is in non-viewing position.

5. Projection apparatus in accordance with claim 1, further comprising a pair of screen-protecting panel sections respectively hinged to and supported by opposite edges of said support frame, said panel sections being receivable in substantially coplanar relation within said support frame so as to overlie said image observation screen when the latter is in non-viewing position.

6. A housing for an image producing device including a base member having four upright walls which are substantially rectangular in cross-section, a pair of substantially vertical grooves respectively formed in the inner surface of two oppositely-disposed walls of said base member, a reflecting element, a panel supporting said reflecting element, a pair of cam followers mounted on said panel and respectively slidably receivable in said grooves, an image observation screen, a substantially rectangular support for said image observation screen, and means pivotally securing said screen support both to said panel and to the top edge of one of the two upright walls not containing said grooves.

7. A housing in accordance with claim 6, further comprising a pair of protective members respectively pivotally secured to opposite edges of said screen support, said protective members being adapted to be selectively pivoted into substantially coplanar relation to overlie said image observation screen.

8. A housing in accordance with claim 6, further including a latching member pivotally secured to the inner surface of one of said oppositely-disposed walls so as to partially overlie the groove formed therein, and means responsive to the selective movement of said screen support for causing the cam follower receivable in said groove to engage said latching member and be urged thereby against the upper end of said groove.

9. A housing in accordance with claim 6, further including a latching member pivotally secured to the inner surface of one of said oppositely-disposed walls so as to partially overlie the groove formed therein, said latching member comprising a bar having a pair of arms extending substantially at right angles one to the other, a spring member, means securing said spring member both to the inner surface of said one wall and to one of the arms of said bar, means for normally maintaining one of said arms across the opening formed by said groove, adjustable means positioned at the upper end of said groove, and means responsive to the selective movement of said screen support for causing the cam follower receivable in said groove to engage said one arm, whereby said bar will be pivoted, and said remaining arm will extend across the opening formed by said groove to urge said cam follower against said adjustable means due to the action of said spring member.

GEORGE M. DALY.

REFERENCES CITED

The following references are of record in the file of this patent:

UNITED STATES PATENTS

| Number | Name | Date |
|---|---|---|
| 1,613,188 | Mullen | Jan. 4, 1927 |
| 1,706,296 | James | Mar. 19, 1929 |
| 1,973,378 | Graesser | Sept. 11, 1934 |
| 2,022,903 | Thomas | Dec. 3, 1935 |
| 2,229,302 | Martin et al. | Jan. 21, 1941 |
| 2,268,104 | Bentley | Dec. 30, 1941 |

FOREIGN PATENTS

| Number | Country | Date |
|---|---|---|
| 7,549 | Great Britain | July 8, 1898 |
| 496,835 | Great Britain | Dec. 7, 1938 |
| 841,477 | France | May 22, 1939 |